United States Patent [19]
Arai

[11] 3,914,083
[45] Oct. 21, 1975

[54] ROLLING APPARATUS FOR MANUFACTURING PLASTIC GEARS

[75] Inventor: Toshimasa Arai, Nagoya, Japan

[73] Assignee: President of Nagoya Institute of Technology, Kokichi Sano, Nagoya, Japan

[22] Filed: Apr. 4, 1974

[21] Appl. No.: 457,699

Related U.S. Application Data
[62] Division of Ser. No. 340,531, March 12, 1973, Pat. No. 3,852,400.

[30] Foreign Application Priority Data
Mar. 18, 1972 Japan.............................. 47-27942

[52] U.S. Cl............. 425/324 R; 425/328; 425/363; 425/407; 425/409; 72/69; 72/103; 72/111
[51] Int. Cl.².................. B29D 15/00; B29C 15/00
[58] Field of Search........ 72/69, 103, 111; 425/363, 425/407, 409, 328, 237, 324 R

[56] References Cited
UNITED STATES PATENTS

| | | | |
|---|---|---|---|
| 248,167 | 10/1881 | Harvey................................ | 72/103 |
| 270,314 | 1/1883 | Hope................................... | 72/103 |
| 1,243,052 | 10/1917 | Dieter.................................. | 72/69 |
| 1,319,142 | 10/1919 | Dieter.................................. | 72/68 |
| 2,159,044 | 5/1939 | Paterson............................ | 425/363 |
| 2,627,767 | 2/1953 | Batchelder....................... | 72/103 X |

*Primary Examiner*—Robert L. Spicer, Jr.
*Attorney, Agent, or Firm*—Frank J. Jordan

[57] ABSTRACT

Gears of thermo-plastic resins are manufactured by a rolling method in which a hot rolling instrument and a cold rolling instrument are applied in a rolling operation to a plastic raw material in the form of a gear blank.

5 Claims, 9 Drawing Figures

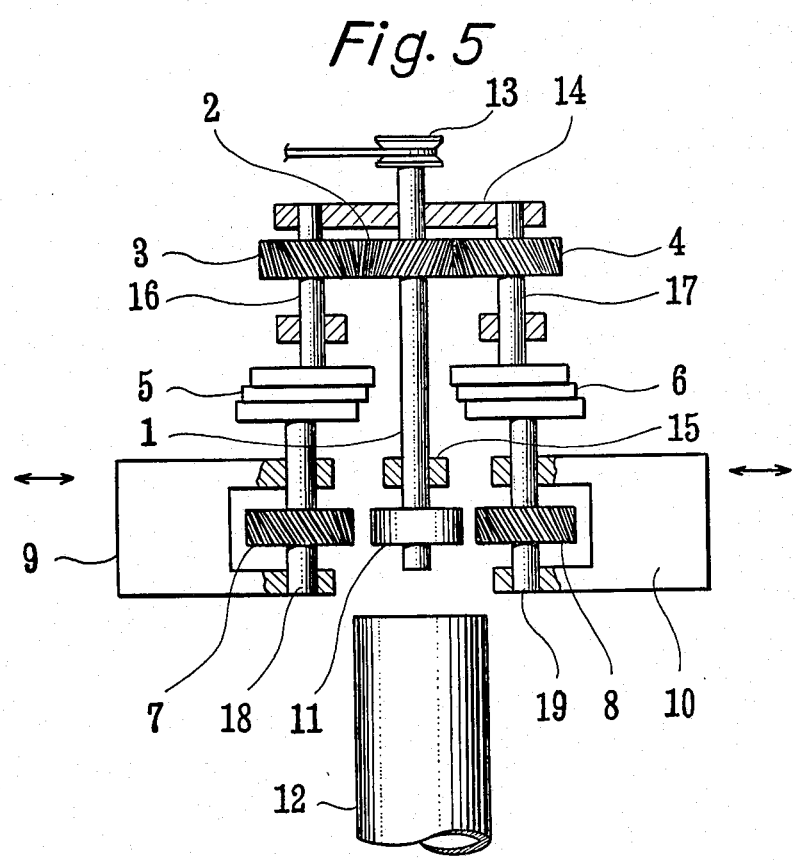

ROLLING APPARATUS FOR MANUFACTURING PLASTIC GEARS

This is a division, of application Ser. No. 340,531, filed Mar. 12, 1973, now U.S. Pat. No. 3,852,400.

BACKGROUND OF THE INVENTION

The present invention relates to a method for manufacturing plastic gears utilizing rolling operations. More specifically, the present invention comprises initially utilizing a rough rolling operation in which a hot rolling instrument is used and a succeeding finishing rolling operation in which a cold rolling instrument is used. The rolling operations are applied to a hot raw material, which may be a plastic raw material heated or preheated by other means besides being in contact with the hot rolling instrument or to a cold raw material which is at normal room temperature or which is not heated by any other means besides being in contact with the rolling instrument. The aforementioned rolling operations are operable to generate gear teeth in the above raw material to obtain suitable plastic gears of particularly small module.

In general it is known to employ an injection molding method or a tooth cutting method for manufacturing gears of thermoplastic resins such as Nylon, Derlin, Duracon (trade names) and the like.

Although a rolling method is the most advantageous method and is widely used for manufacturing metallic gears, a rolling method for manufacturing plastic gears has not been used heretofore. The reason for this is as follows:

a. In a cold rolling operation, only a cold rolling instrument (hereinafter referring to a cold instrument) is brought into contact with a cold raw material made of plastic as well as of metal. In the case of metal, since the raw material is transferred from an elasticity region of quite small extent directly to a plasticity region, recovery of elasticity upon moving backwards or withdrawal of the cold instrument is quite small thus, a correct or desired tooth form is easily generated. However, in the case of plastics, the elasticity region and the plasticity region have a similar extent and about a half of the deformation is recovered in elasticity upon moving backwards or withdrawal of the cold instrument. Accordingly a correct or desired tooth form can not be naturally generated and even a similar tooth form can not be generated practically.

Thus, a successful and practical method for manufacturing gears using a cold rolling method is not possible.

b. In a hot rolling operation the following two methods are employed:

The first one involves a method of bringing a cold instrument into contact with a hot plastic raw material as in the case of metal. Since a plastic raw material can not have applied thereto high frequency heating, unpractical means requiring a long time such as outer radiation heating with Nichrome wire or immersion in a hot oil bath must be used.

The other method, which has been developed by the inventor of the present invention and which is not applied to metals is a method in which a hot instrument is brought into contact with a cold raw material. This method produces results similar to that of a cold rolling at a low temperature of the hot instrument, whereas at a high temperature of the hot instrument gears may be generated in which the top of the gear teeth are drum-shaped and the tooth root is like the bottom of a ship and although the tooth form is incorrect, it is slightly better than the tooth form obtained by cold rolling as shown in FIG. 3 and FIG. 4.

Accordingly, a method for manufacturing plastic gears using a hot rolling method as known form the prior art is not practical.

SUMMARY OF THE INVENTION

An object of the present invention is to overcome the disadvantages of known prior art methods and to make practicable a rolling method for manufacturing plastic gears by means of a novel rolling method in which two types of instruments, a hot instrument and a cold instrument, are exchangeably or simultaneously used apart from the concept that rolling methods are classified into cold rolling and hot rolling.

Another object of the invention is to finish precise plastic gears in a relatively short time by means of a new rolling method, wherein the plastic gears have the following advantages:

a. The surface of the finished gear is smooth and the coefficient of friction is low so that it has a high efficiency.

b. The tooth surface is the most smooth at its curved surface.

c. The continuity of the fiber at the tooth surface provides a strong structure and improves the intensity of the gear teeth.

d. The work may be performed by means of a small and simple rolling machine.

e. The work time required to manufacture such gears is relatively short.

f. Crown gear forms can be generated.

g. Tooth forms which expand because of humidity may be corrected and rolled.

A feature of the present invention is that the preheating and heating of the raw material and the selection and exchanging timing of the two types of instruments may be suitably adjusted. Another feature of the present invention is that the method may be applied not only to pinion type instruments or gears but also, to forming instruments or gears such as rack type gears and inner or internal type gears and the like.

BRIEF DESCRIPTION OF THE DRAWINGS

FIG. 5 is a schematic plan view partly in section of apparatus embodying the method according to the present invention;

DETAILED DESCRIPTION OF THE SPECIFIC EMBODIMENTS

The process of the present invention comprises an initial rough rolling in which a cylinder-shaped raw material or gear blank is deformed into a form and dimension similar to a complete gear in a relatively short time by application of a pressing operation by a hot instrument and following this by a finishing rolling operation with a cold instrument that makes the gear into the correct form and dimension.

Based on the inventor's new theory that dimensional errors necessarily exist because of the fluctuation of distance between the axis by pushing or moving an instrument toward a raw material during a rough rolling operation and the inventor's experimental results that a hot rolling operation produces better tooth form that that formed by a cold rolling operation, a similar tooth form is generated at as short time as possible by softening or melting the surface of the raw material with a hot instrument.

It is possible that a hot instrument heated to a temperature higher than the softening temperature of the raw material may be pushed to a cold raw material, however, a preheating of the raw material in a raw material supplying equipment as described hereinafter or radiation heating or oil heating both on the raw material axis decreases the work time and a good result can be obtained.

In the present invention, a hot instrument refers generally to an instrument heated at a temperature higher than the softening temperature of the raw material (inclusively, a temperature higher than the melting point) by any means whereas a cold instrument refers generally to an instrument held at a temperature lower than the temperature of the hot instrument (inclusively normal or room temperature).

In the initial step of the finishing rolling process, "correction of form and dimension" is performed in a relatively short time, that is, errors produced during rough rolling are corrected at the softened or melted state of the raw material surface.

The "correction of form and dimension" is the most important process throughout the whole operation, and therefore, exchangeable or simultaneous use of a hot instrument and a cold instrument must be suitably effected according to the characteristic of the plastic raw material.

In the final step of the finishing rolling process, the raw material is cooled and hardened in a short time with a cold instrument in order to effect "stabilization of corrected form and dimension."

Figure 6:
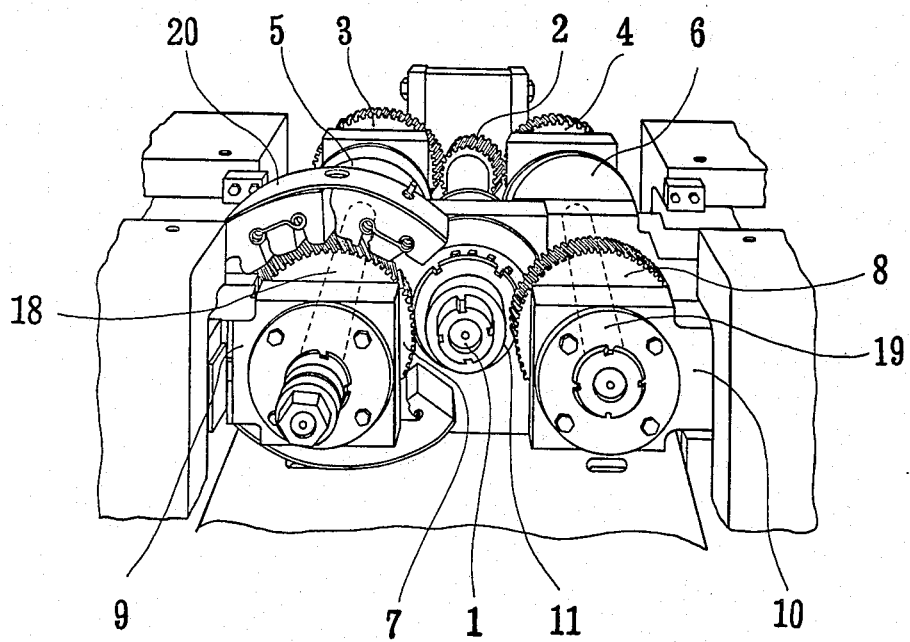
FIG. 6 is a perspective view of the apparatus shown in FIG. 5.

FIG. 5 and FIG. 6 show an example of apparatus embodying the rolling method according to the present invention. On one end of a raw material shaft 1 mounted horizontally by means of bearings (not shown) on frames 14, 15, there is mounted a driving gear 2 and a belt wheel 13 which obtains power from a generator or motor (not shown). On the other end of the raw material shaft 1 is arranged a raw material support (not shown) for mounting a raw material 11 or gear blank.

On both sides of the raw material shaft 1 driven shafts 16 and 17 are mounted by means of bearings (not shown). On both driven shaft 16 and 17 there is mounted a driven gear 3 and 4 respectively which interlocks or meshes with driven gear 2 without backlash. Both driven shafts 16 and 17 are connected to two other shafts 18 and 19 through Oldham's couplings 5 and 6 respectively which effect the coupling therebetween even though the shafts being coupled are slightly out of line.

Both shafts 18 and 19 are supported on slide supports 9 and 10 movably laterally or in a direction perpendicular to the axes of the shafts.

A pinion type hot instrument 7 is mounted on the movable shaft 18 whereas a pinion type cold instrument 8 is mounted on the other movable shaft 19 so that the shafts 18 and 19 may be moved together with the respective slide support against the raw material 11.

The hot instrument 7 is subjected to selective use or simultaneous use of high frequency heating, radiation heating by a heater 20 arranged around the hot instrument 7, or heating by a heater arranged within the hot instrument or an oil bath.

In FIG. 5 numeral 12 designates a raw material supply apparatus arranged opposite to the longidudinal end of the raw material shaft 11 and coaxial therewith. Within the raw material supply apparatus is enclosed a plastic raw material cut into cylindrical form and which may be made and supplied as a hot raw material if necessary. In this case, the supply apparatus 12 is rotated, and the raw material is subjected to radiation heating with a heater arranged around the supply apparatus 12 in a manner to provide uniform heating of the raw material. Also the raw material may be heated with an oil bath.

An embodiment of the rolling method for gears will now be explained. A raw material enclosed within the supply apparatus 12 is subjected to pre-heating and rotation so that a definite depth from the material surface may be suitably softened. The raw material 11 is transmitted from the supply apparatus 12 to the raw material shaft 1 and held thereon for rotation with the shaft 1. At the same time the two pinion-type instruments 18 and 19 are also rotated through driven gears 3 and 4, driven shafts 16 and 17, Oldham's couplings 5 and 6 and movable shafts 18 and 19.

The raw material 11 on the shaft 1 is subjected to a prevention of decrease of the surface temperature and also to accelerated softening if necessary by radiation heating means (not shown). The rotating hot instrument 7 is pushed into the raw material 11 to a definite depth by forward movement of the slide support 9 so as to perform rough rolling as early as possible and then the other slide shaft 10 is moved forward to contact the cold instrument 7 with the similar tooth form for finishing rolling.

In this case, if the timing of the movement backwards or withdrawal of the hot instrument 7 is earlier than the contacting by the cold instrument 8, both instruments 7 and 8 are exchangeably used, and if the aforementioned timing of the movement backwards or withdrawal is later than the contacting by the cold instrument 8, both instruments 7 and 8 are simultaneously used.

In the finishing rolling operation, approximately the same condition as in the rolling is preferrable until finishing of the correction of the tooth form and tooth surface, and then, since cooling for fixing the tooth form and dimesnion is necessary, finishing rolling ends at a time of using a cold instrument in principle.

Also in a finishing rolling operation corresponding to the characteristics of the raw material and the type and degree of errors to be corrected, exchangeable or simultaneous use of hot and cold instruments is preferable, as follows:

1. Rough rolling ends with a hot instrument, and finishing rolling begins with a cold instrument.
2. Rough rolling ends with hot rolling, and finishing rolling is performed with a hot instrument at an earlier step and with a cold instrument at a later step.
3. Rough rolling is performed with hot rolling at an earlier step and with a cold instrument at a later step, and a finishing step is performed with a cold instrument.
4. Hot and cold instruments are simultaneously used at the final step of rough rolling, and finishing rolling is performed with a cold instrument.
5. Rough rolling ends with a hot instrument, and a finishing rolling is performed with simultaneous use of hot and cold instruments at an earlier step and with a cold instrument at a later step.
6. Hot and cold instruments are simultaneously used at the final step of rough rolling and successively used also at an earlier step of finishing rolling and a cold instrument is used at a later step of finishing rolling.

Figure 1:
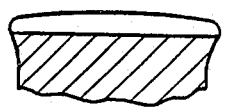
FIG. 1 is a partial sectional view of a nylon gear manufactured by rollong a cold raw material with only a cold instrument according to a known and conventional method of cold rolling.
Figure 2:
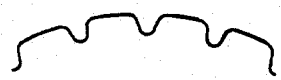
FIG. 2 is a side view of the gear shown in FIG. 1 showing the form of the gear teeth.
Figure 3:
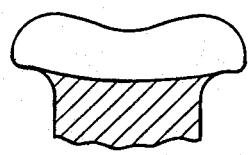
FIG. 3 is a partial sectional view of a nylon gear manufactured by rolling a cold raw material with only a hot instrument also according a known and conventional method of hot rolling.
Figure 4:
FIG. 4 is a side view of the gear shown in FIG. 3 showing the form of the gear teeth.
Figure 7:
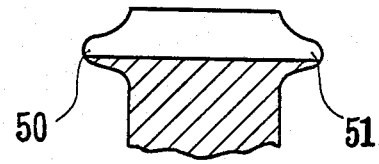
FIG. 7 is a sectional view of a nylon gear which has applied thereto a finish rolling operation according to the present invention.
Figure 9:
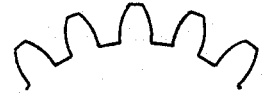
FIG. 9 is a side view of the gear shown in FIG. 8.
Figure 8:
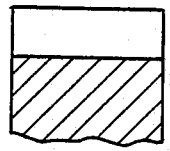
FIG. 8 is a sectional view of the nylon gear shown in FIG. 7 after the chips on both sides have been cut away.

FIG. 7 is a fragmentary sectional view of a Nylon gear to which there has been applied a finishing rolling operation according to the rolling method of the present invention, wherein chips or protrusions 50 and 51 produced at both ends are removed by mechanical or manual means. FIG. 8 is a fragmentary view of a completed gear in which the chips have been removed, and FIG. 9 shows the tooth form.

When Nylon 6 or Delrin is used as a raw material 11, the raw material can be rolled at temperature within the range of about 220°–280° Centigrade whether there is preheating or not. If there is no pre-heating, best results are obtained at about 260° Centigrade and according to the addition of pre-heating, the suitable temperature transfers towards low.

Thus a rolling method for manufactureing plastic gears which has not been practicable by only a cold instrument or by only a hot instrument in the prior art, becomes practicable by exchangeable or simultaneous use of a hot instrument and a cold instrument, and moreover, plastic gears of high accuracy can be obtained by means of comparatively small equipment.

Examples of specific embodiments follow:

EXAMPLE 1 raw material: Nylon 6
outer diameter: 49.44mm
width: 10 mm
revolution: 30 r.p.m. instrument
hot instrument: temperature 220°–300° Centigrade
  pushing speed 0.065 mm/sec.
cold instrument: temperature normal room temperature
total contacting time: 60 seconds

EXAMPLE 2

1. Material (Nylon & Delrin)
  diameter of gear blank
    (without teeth): 50.00 mm
  width of gear blank: 10.00 mm
  preheated temperature: 60–100 degrees Centigrade
  revolution per minute: 30
2. Tool (hot & cold)
  temperature of hot tool: 250–260 degrees Centigrade
  radial feed of hot tool: 0.15 mm/sec.
  temperature of cold tool: room temperature
  total time of contact: 40–50 seconds
3. Accuracy of rolled Nylon gear
  tooth profile error: 12μ (4th class JIS)
  pitch error: 9μ (3rd class JIS)
4. Accuracy of rolled Delrin gear
  tooth profile error: 8μ (3rd class JIS)
  pitch error: 7μ (3rd class JIS)

REFERENCE

JIS standard
Allowable error relating to gears module:
  more than 1 mm
  1.6 mm or less
diameter of pitch circle:
  more than 25 mm
  50 mm or less

| class | tooth profile error ($\mu$) | single pitch error ($\mu$) |
|---|---|---|
| 0 | 3 | 3 |
| 1 | 4 | 5 |
| 2 | 6 | 7 |
| 3 | 9 | 10 |
| 4 | 13 | 14 |
| 5 | 18 | 19 |
| 6 | 25 | 28 |
| 7 | 35 | 55 |
| 8 | 50 | 110 |

What is claimed is:

1. Apparatus for making plastic gears comprising a first shaft, a gear blank mounted on said first shaft, a second shaft disposed parallel to said first shaft, a cold instrument mounted on said second shaft, means for moving said second shaft in a direction perpendicular to the longitudinal axis of said second shaft to thereby move said cold instrument into and out of contact with said gear blank, a third shaft disposed parallel to said first shaft, a hot instrument mounted on said third shaft, means for moving said third shaft in a direction perpendicular to the longitudinal axis of said first shaft to thereby move said third shaft into and out of contact with said gear blank, and means for synchronously driving said first, second and third shafts whereby said hot instrument forms gear teeth in an initial operation on said gear blank and said cold instrument performs a finishing operation on said gear teeth.

2. Apparatus according to claim 1 wherein said hot instrument and cold instrument are pinion gears.

3. Apparatus according to claim 1 including Odlum cluthes between said first shaft and said driving means and between said second shaft and said driving means.

4. Apparatus according to claim 1 including means for heating said hot instrument.

5. Apparatus according to claim 4 wherein said heating means is mounted on said means for moving said third shaft in said perpendicular direction.

* * * * *